(12) United States Patent
Chen et al.

(10) Patent No.: US 9,024,880 B2
(45) Date of Patent: ***May 5, 2015

(54) INTERACTIVE SYSTEM CAPABLE OF IMPROVING IMAGE PROCESSING

(75) Inventors: Hsin-Chia Chen, Hsin-Chu (TW);
Chih-Hung Lu, Hsin-Chu (TW);
Cho-Yi Lin, Hsin-Chu (TW); Tzu-Yi Chao, Hsin-Chu (TW)

(73) Assignee: PixArt Imaging Inc., Science-Based Industrial Park, Hsin-Chu (TW)

( * ) Notice: Subject to any disclaimer, the term of this patent is extended or adjusted under 35 U.S.C. 154(b) by 810 days.

This patent is subject to a terminal disclaimer.

(21) Appl. No.: 12/775,467

(22) Filed: May 6, 2010

(65) Prior Publication Data

US 2010/0220210 A1 Sep. 2, 2010

Related U.S. Application Data

(63) Continuation-in-part of application No. 10/904,301, filed on Nov. 3, 2004, now Pat. No. 8,072,426.

(30) Foreign Application Priority Data

Aug. 11, 2004 (TW) .............................. 93124089 A

(51) Int. Cl.
*G06T 7/40* (2006.01)
*G06T 7/00* (2006.01)
*G06T 7/60* (2006.01)

(52) U.S. Cl.
CPC ................. *G06T 7/408* (2013.01); *G06T 7/004* (2013.01); *G06T 7/0081* (2013.01); *G06T 7/602* (2013.01); *G06T 2207/10016* (2013.01)

(58) Field of Classification Search
USPC ............ 345/164, 156, 419, 173; 82/103, 164, 82/286, 291; 715/700, 702, 716, 773; 382/103, 164, 286, 291
See application file for complete search history.

(56) References Cited

U.S. PATENT DOCUMENTS 5,619,281 A 4/1997 Jung
5,742,294 A * 4/1998 Watanabe et al. ............. 345/672
(Continued)

FOREIGN PATENT DOCUMENTS

CN 1164076 A 11/1997
CN 1152296 C 6/2004
(Continued)

*Primary Examiner* — Abbas Abdulselam
*Assistant Examiner* — Shaheda Abdin
(74) *Attorney, Agent, or Firm* — Winston Hsu; Scott Margo

(57) ABSTRACT

An interactive system capable of improving image processing includes a reference device, a processing module and a controller. The reference device is used for transmitting and/or reflecting light signals within a predetermined spectrum. The processing module includes an image sensor, an estimation unit and a transmission interface. The image sensor is used for sensing an image so as to generate pixel signals; the estimation unit is used for determining static parameters of at least one image object according to the pixel signals; and the transmission interface is used for serially outputting the static parameters of the at least one image object. The controller is used for controlling operation of the interactive system according to the static parameters of the at least one image object outputted from the transmission interface. The image sensor, the estimation unit, and the transmission interface can all be formed on the same substrate.

19 Claims, 3 Drawing Sheets

(56) References Cited

U.S. PATENT DOCUMENTS

| | | | |
|---|---|---|---|
| 5,897,663 A | 4/1999 | Stancil | |
| 5,956,415 A * | 9/1999 | McCalley et al. | 382/124 |
| 6,256,016 B1 | 7/2001 | Piot | |
| 6,580,415 B1 | 6/2003 | Kato | |
| 6,728,395 B1 | 4/2004 | Kage | |
| 6,804,030 B1 * | 10/2004 | Walmsley et al. | 358/3.07 |
| 6,859,199 B2 | 2/2005 | Shi | |
| 6,924,787 B2 | 8/2005 | Kramer | |
| 7,042,439 B2 | 5/2006 | Luo | |
| 7,085,408 B1 | 8/2006 | Chung-Chi Jim | |
| 7,085,418 B2 | 8/2006 | Kaneko | |
| 7,102,615 B2 | 9/2006 | Marks | |
| 7,170,494 B2 | 1/2007 | Park | |
| 7,242,391 B2 | 7/2007 | Lin | |
| 7,417,623 B2 | 8/2008 | Lin | |
| 7,633,489 B2 | 12/2009 | Lee | |
| 7,796,116 B2 | 9/2010 | Salsman | |
| 7,796,120 B2 | 9/2010 | Chou | |
| 7,852,317 B2 | 12/2010 | Grunnet-Jepsen | |
| 7,864,159 B2 | 1/2011 | Sweetser | |
| 2003/0085878 A1 | 5/2003 | Luo | |
| 2003/0193529 A1 | 10/2003 | Lee | |
| 2003/0193561 A1 | 10/2003 | Tecchiolli | |
| 2004/0017473 A1 * | 1/2004 | Marks | 348/207.1 |
| 2005/0071499 A1 | 3/2005 | Batra | |
| 2008/0278445 A1 | 11/2008 | Sweetser | |
| 2010/0220210 A1 | 9/2010 | Chen | |
| 2011/0095980 A1 | 4/2011 | Sweetser | |

FOREIGN PATENT DOCUMENTS

| | | |
|---|---|---|
| CN | 100559334 C | 11/2009 |
| JP | H08125935 A | 5/1996 |
| JP | H10224696 A | 8/1998 |
| JP | 2001141981 A | 5/2001 |
| JP | 2001242780 A | 9/2001 |
| JP | 2002101332 A | 4/2002 |
| JP | 2002268663 A | 9/2002 |
| JP | 2003110895 A | 4/2003 |
| TW | 200607340 | 2/2006 |
| WO | 0067960 A1 | 11/2000 |

* cited by examiner

US 9,024,880 B2

INTERACTIVE SYSTEM CAPABLE OF IMPROVING IMAGE PROCESSING

CROSS REFERENCE TO RELATED APPLICATIONS

This is a continuation-in-part of application Ser. No. 10/904,301, filed Nov. 3, 2004, which is included in its entirety herein by reference.

BACKGROUND OF THE INVENTION

1. Field of the Invention

The present invention relates to an interactive system, and more specifically, to an interactive system capable of improving image processing.

2. Description of the Prior Art

With the popularization of multimedia applications, conventional image sensors installed within digital devices, such as digital video camcorders and digital still cameras (DSC), are used for taking moving images. Generally speaking, image sensors with higher resolutions are able to produce high quality digital images, and thus can be used for image distinguishing and fingerprint identification purposes. Image sensors with lower resolution, however, are used in interactive toys for simple motion distinguishing purposes. Take mechanical pets for example; the built-in camera installed inside the mechanical pets functions as an "eye" of the interactive toy to sense users' motion and then indicate different instructions through a control circuit.

Please refer to FIG. 1. FIG. 1 is a functional block diagram of an interactive system 10 according to the prior art. The interactive system 10 includes an image sensor 12, a micro-controller 14, and a parallel transmission bus 16. The image sensor 12 contains a CMOS sensing array 22 and an analog to digital converter (ADC) 24. Data sensed by the CMOS sensing array 22 are transmitted to the analog to digital converter 24. Because the CMOS sensing array 22 is capable of sensing a plurality of pixel data for forming images, the CMOS sensing array 22 of the image sensor 12 will generate various pixel data continuously while taking continuously moving images. In order to transmit a considerable amount of pixel data, the sensed pixel data between the image sensor 12 and the controller 14 are transmitted through a parallel transmission bus 16, and then the micro-controller 14 recomposes the object images or determines the condition of the object based on the above pixel data to control the operation of the interactive system 10.

The huge amount of the sensed data is considerable, however, and the velocity of parallel transmission with complex hardware structures is slower than that of serial transmission with the high development of serial transmission. Furthermore, the micro-controller 14 still has to determine and analyze the necessary data after receiving the sensed data transmitted through the parallel transmission interface. Because the applied sphere of each micro-controller 14 is not consistent, taking the micro-controller installed within an optical mouse as an example, the micro-controller 14 does not need to obtain entire and detailed image data, but can instead obtain just the trail of relatively moving positions of image objects. As a result, if users utilize the conventional image sensor 12 for generating pixel data, the microcontroller 14 has to receive and process all pixel data, resulting in a major burden while processing the image data.

Moreover, the traditional image sensor 12 for transforming received light into electrical signals is implemented as a single chip. Therefore, it is necessary to improve such image sensor 12 made as a single chip using the trend of system-on-chip circuit design.

SUMMARY OF THE INVENTION

It is therefore a primary objective of the claimed invention to provide an interactive system that calculates the desired image parameters in advance using a chip which integrates image processing circuits and an image sensor onto the same substrate and then transmits the parameters to the controller to reduce the complexity of the design of the controller and to speed up image processing.

According to the claimed invention, an interactive system capable of improving image processing comprises a processing module and a controller. The processing module comprises an image sensor for sensing an image so as to generate pixel signals; an estimation unit for determining static parameters of at least one image object according to the pixel signals, the at least one image object being a set of pixel signals with a substantially identical color parameter; and a transmission interface for serially outputting the static parameters of the at least one image object. The controller is used for controlling operation of the interactive system according to the static parameters of the at least one image object outputted from the transmission interface.

According to the claimed invention, an interactive system capable of improving image processing comprises a reference device, a processing module and a controller. The reference device is used for transmitting and/or reflecting light signals within a predetermined spectrum. The processing module comprises an image sensor for sensing the light signals so as to generate pixel signals, an estimation unit for determining static parameters of at least one image object according to the pixel signals; and a transmission interface for serially outputting the static parameters of the at least one image object. The controller is used for controlling operation of the interactive system according to the static parameters of the at least one image object outputted from the transmission interface.

According to the claimed invention, an interactive method capable of improving image processing comprises transmitting and/or reflecting light signals within a predetermined spectrum; sensing the light signals so as to generate pixel signals; determining static parameters of at least one image object according to the pixel signals; serially outputting the static parameters of the at least one image object; and controlling operation of the interactive system according to the static parameters of the at least one image object.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
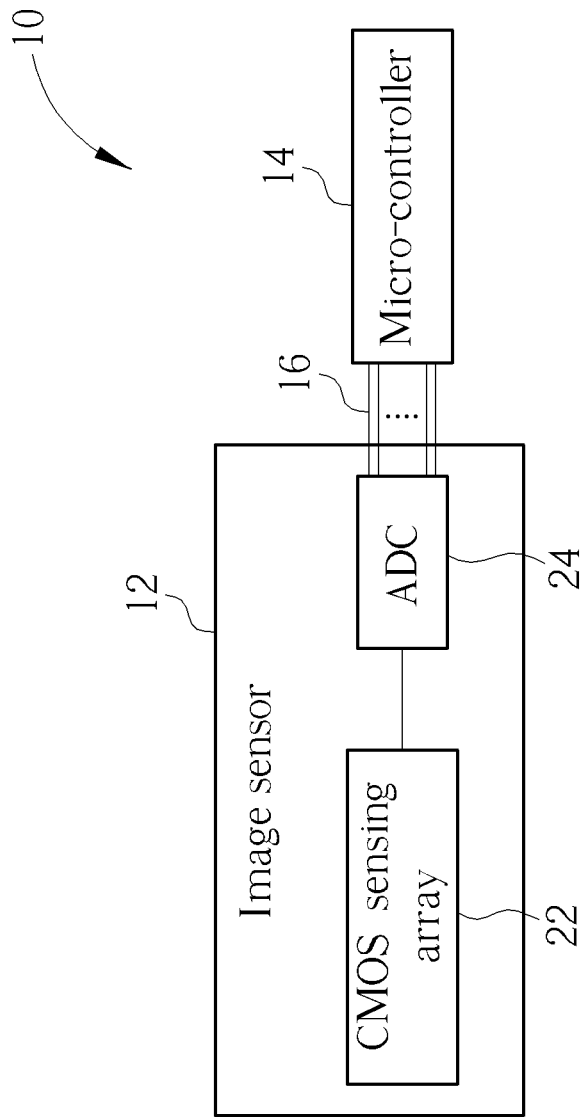
FIG. 1 is a functional block diagram of the interactive system according to the prior art.
Figure 2:
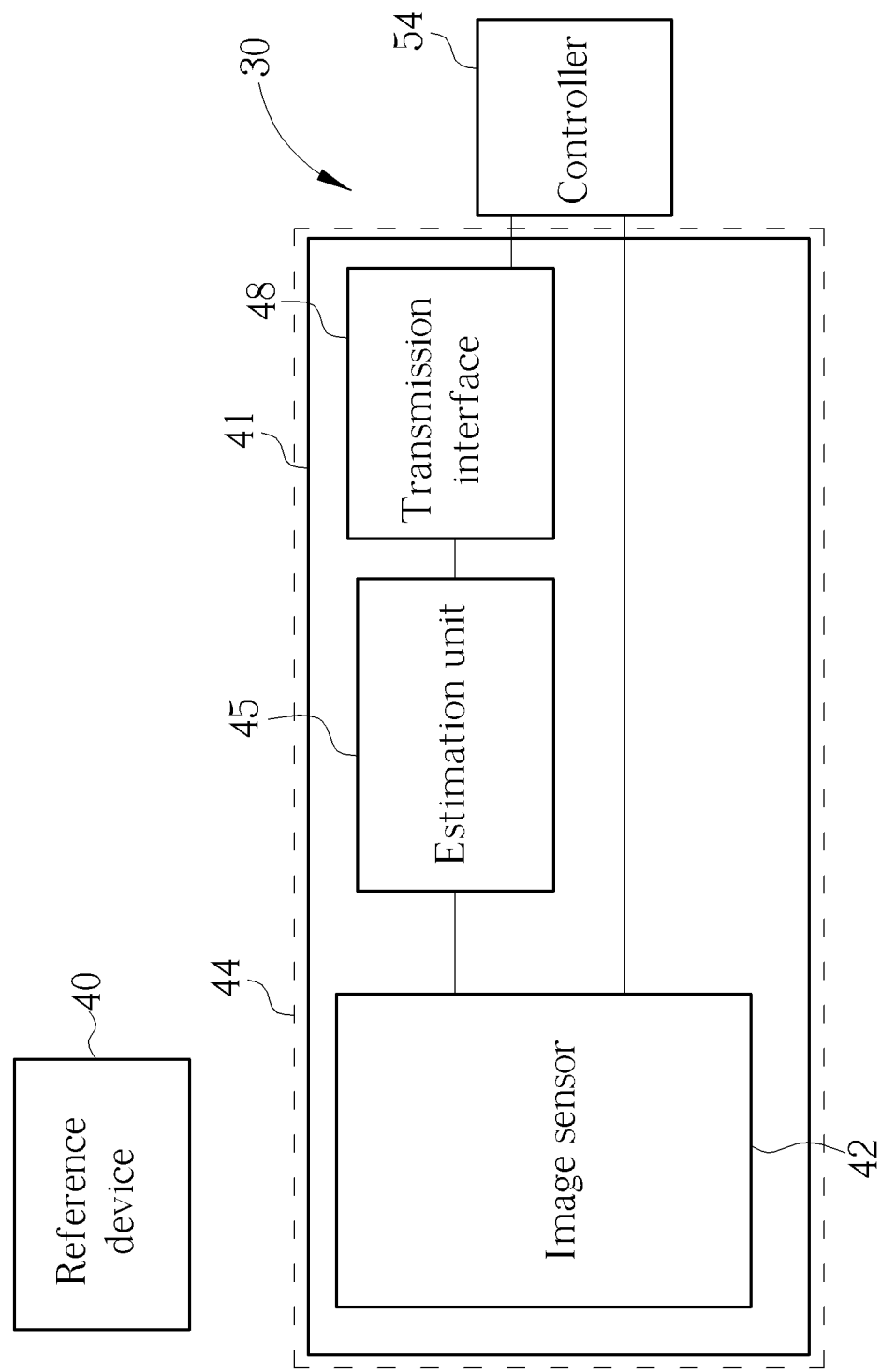
FIG. 2 is a functional block diagram of the interactive system according to the present invention.

Please refer to FIG. 2. FIG. 2 is a functional block diagram of the interactive system 30 according to the present invention. The interactive system 30 can be an interactive toy. The interactive system 30 contains a reference device 40, a processing module 44 that is a chip, and a controller 54. The reference device 40 is a light source, a reflective device or a combination of the light source and the reflective device. The reference device 40 comprises a filter for filtering original light signals so as to filter out light signals outside the predetermined spectrum, thereby transmitting and/or reflecting light signals within a predetermined spectrum. The processing module 44 comprises an image sensor 42, an estimation unit and a transmission interface 48. The image sensor 42 is a charge-coupled device (CCD) or a CMOS optical sensor, for sensing the light signals so as to generate pixel signals, and then transmitting the pixel signals to the estimation unit 45. The estimation unit 45 is used for determining static parameters of at least one image object according to the pixel signals. The transmission interface 48 is used for serially outputting the static parameters of the at least one image object. The controller 54 is used for controlling operation of the interactive system 30 according to the static parameters of the at least one image object outputted from the transmission interface 48. The image sensor 42, the estimation unit 45, and the transmission interfaces 48 can all be formed on a substrate 41.

Figure 3:
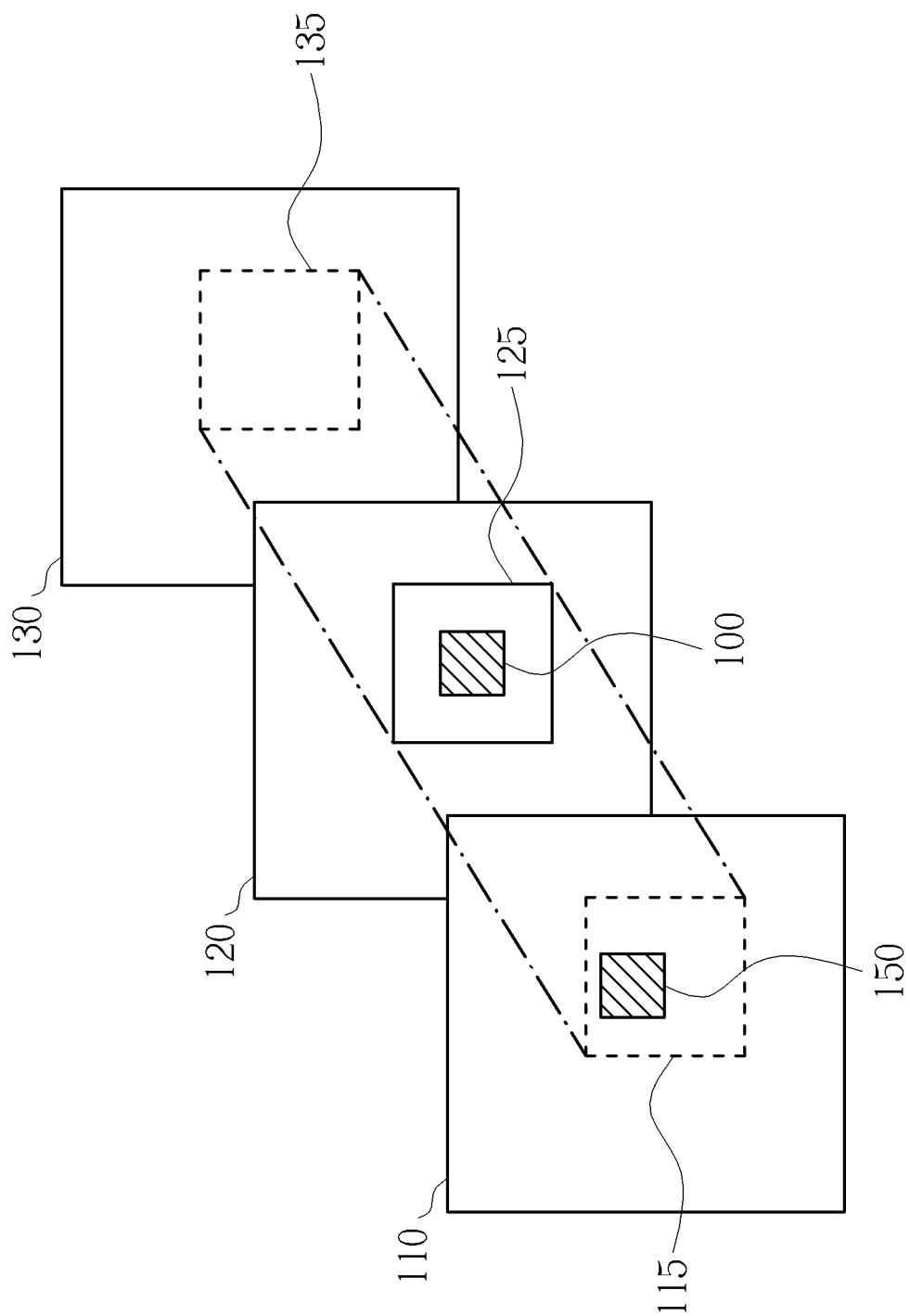
FIG. 3 shows multiple image pictures.

Please refer to FIG. 3. FIG. 3 shows multiple image pictures. Each picture comprises a plurality of pixel signals. Take the 800*600 pixel picture as an example. The image sensor 42 is used for sensing the light signals transmitted from the reference device 40 so as to generate pixel signals. After a pixel signal is generated, the pixel signal is transmitted to the estimation unit 45. Then the estimation unit 45 determines whether the pixel signal matches a predetermined condition. If the pixel signal matches the predetermined condition, and pixel signals adjacent to the pixel signal also match the predetermined condition, then the plurality of pixel signals which are adjacent to one another and match the predetermined condition are determined to be an object. And then the estimation unit 45 can determine static parameters of the object such as the coordinate, the center of gravity, the area, the boundary, the orientation, colors, endpoints, and the length to width ratio of the object. Where the colors of the object include the average color, the color of the pixal signal located at the center of the gravity, and the color of the pixel signals with the largest luminance. The predetermined condition may be luminance being between a first predetermined threshold and a second predetermined threshold such as corresponding to between a gray level of 80 and a gray level of 200. Take the target picture 120 as an example, various static parameters can be determined for the target object 100 in the target picture 120. In particular, the center of gravity of the target object 100 is generated as follows:

$$(G_x, G_y) = \left( \frac{\sum_{(x,y) \in R} L(x, y) \times x}{\sum_{(x,y) \in R} L(x, y)}, \frac{\sum_{(x,y) \in R} L(x, y) \times y}{\sum_{(x,y) \in R} L(x, y)} \right),$$

and $$R = \{(x, y) : L(x, y) > TH\}.$$

Where L(x,y) is intensity of one of the pixel signals; and TH is the first predetermined threshold.

The target object 100 is taken as a set of pixel signals with a substantially identical color parameter. Thus the set of pixel signals includes pixel signals with different but similar colors as well as pixel signals with identical colors. The estimation unit 45 is capable of determining parameters of the target object 100 in the target picture 120, (e.g. an area, boundary, and gray-scale value), according to the number of the substantially identical pixel signals and their corresponding coordinates. The estimation unit 45 further determines parameters such as endpoints and the length to width ratio of the target object 100. Suppose the target object 100 is a rectangle, the estimation unit 45 will determine the number of endpoints of the object to be 4 and will determine the object's length to width ratio. That is to say, the static parameters are measurable parameters of the target object 100 while the target object 100 is being statically displayed.

After obtaining related parameters for each object of the picture 120, the estimation unit 45 transmits the static parameters to the transmission interface 48. The transmission interface 48 can be a universal asynchronous receiver/transmitter (UART) interface. Compared with synchronous parallel transmission, asynchronous serial transmission has the advantages of small volume, low price, and the ability to transmit over a long distance. For instance, a universal asynchronous transceiver is an asynchronous serial/parallel data transmitter for transmitting data between serial devices that control and connect to the interactive system 30 (or a processor). More specifically, the function of the interactive system 30 provided by UART is similar to that of data exchange provided by RS-232 data terminal equipment (DTE), so that the interactive system 30 is capable of exchanging data with serial devices through a universal serial bus (USB).

In addition to the UART mentioned previously (RS-232 is one kind of UART), the transmission interface 48 can be I²C (inter-IC) or USB interfaces. The I²C protocol regulates that data transmission is performed through two two-way (transmit and receive) transmission lines (serial data line SDA and serial clock line). Because the principle of transforming serial data and parallel data with I²C and USB is similar to that with UART and is well known to those skilled in the art, there will be no further description hereinafter.

In other words, the transmission interface 48 can each use at least one kind of interface from the serial transmission groups including the UART, I²C (inter-IC), and USB interfaces.

Ultimately, after receiving the static parameters, e.g. coordinates of an object, an area of an object, colors of an object, orientation of an object, boundary of an object, endpoints of an object, and length to width ratio of an object, transmitted from the transmission interfaces 48, the controller 54 is able to utilize codes of each object in the previous picture 110 in cooperation with static parameters of each object to recover the target picture 120. Where the colors of the object include the average color, the color of the pixal signal located at the center of the gravity, and the color of the pixel signals with the largest luminance. The controller 54 may take further action based on the parameters for controlling the operation of the interactive system 30.

Compared with the prior art, the present invention discloses an interactive system 30 with the reference device 40. The reference device 40 is used for transmitting and/or reflecting light signals within a predetermined spectrum. The image sensor 42 is used for sensing the light signals from the reference device 40 so as to generate pixel signals. The estimation unit 45 determines pixel signals which match a predetermined condition and are adjacent to one another as an object, and determines static parameters of each object of a picture. In this way, the controller 54 at the back end does not need to calculate complicated parameters any more, which reduces the circuit design complexity and shortens the development period of interactive systems.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. An interactive system capable of improving image processing comprising:
    a processing module comprising:
        an image sensor for sensing an image so as to generate pixel signals;
        an estimation unit for determining static parameters of at least one image object according to the pixel signals, the at least one image object representing a set of pixel signals having similar colors, wherein the static parameters represents a coordinate of the at least one image object, an area of the at least one image object, an orientation of the at least one image object, colors of the at least one image object, endpoints of the at least one image object, a length to width ratio of the at least one image object, and/or a boundary of the at least one image object; and
        a transmission interface for serially outputting the static parameters of the at least one image object; and
    a controller for controlling operation of the interactive system according to the static parameters of the at least one image object outputted from the transmission interface, wherein the estimation unit is a chip independent of the controller.

2. The interactive system of the claim 1 wherein the image sensor, the estimation unit, and the transmission interface are formed on a substrate.

3. The interactive system of claim 1 wherein the transmission interface is an I²C interface.

4. The interactive system of claim 1 wherein the transmission interface is a universal serial bus (USB) interface.

5. The interactive system of claim 1 wherein the transmission interface is a universal asynchronous receiver/transmitter (UART).

6. The interactive system of claim 1 wherein the image sensor is a CMOS sensor.

7. The interactive system of claim 1 wherein the image sensor is a charge-coupled device (CCD).

8. An interactive system capable of improving image processing comprising:
    a reference device for transmitting and/or reflecting light signals within a predetermined spectrum;
    a processing module comprising:
        an image sensor for sensing the light signals so as to generate pixel signals;
        an estimation unit for determining static parameters of at least one image object according to the pixel signals, the at least one image object representing a set of pixel signals having similar colors, wherein the static parameters represents a coordinate of the at least one image object, an area of the at least one image object, an orientation of the at least one image object, colors of the at least one image object, endpoints of the at least one image object, a length to width ratio of the at least one image object, and/or a boundary of the at least one image object; and
        a transmission interface for serially outputting the static parameters of the at least one image object; and
    a controller for controlling operation of the interactive system according to the static parameters of the at least one image object outputted from the transmission interface, wherein the estimation unit is a chip independent of the controller.

9. The interactive system of the claim 8 wherein the image sensor, the estimation unit, and the transmission interface are formed on a substrate.

10. The interactive system of claim 8 wherein the reference device comprises a filter for filtering original light signals so as to filter out light signals outside the predetermined spectrum.

11. The interactive system of claim 8 wherein the transmission interface is an I²C interface.

12. The interactive system of claim 8 wherein the transmission interface is a universal serial bus (USB) interface.

13. The interactive system of claim 8 wherein the transmission interface is a universal asynchronous receiver/transmitter (UART).

14. The interactive system of claim 8 wherein the image sensor is a CMOS sensor.

15. The interactive system of claim 8 wherein the image sensor is a charge-coupled device (CCD).

16. An interactive method capable of improving image processing and applied to an interactive system comprising a processing module and a controller, the interactive method comprising:
    transmitting and/or reflecting light signals within a predetermined spectrum;
    sensing the light signals so as to generate pixel signals;
    determining static parameters of at least one image object according to the pixel signals by an estimation unit of the processing module, the at least one image object representing a set of pixel signals having similar colors, wherein the static parameters represents a coordinate of the at least one image object, an area of the at least one image object, an orientation of the at least one image object, colors of the at least one image object, endpoints of the at least one image object, a length to width ratio of the at least one image object, and/or a boundary of the at least one image object;
    serially outputting the static parameters of the at least one image object; and
    controlling operation of the interactive system according to the static parameters of the at least one image object by the controller, wherein the estimation unit is a chip independent of the controller.

17. The method of claim 16 further comprising filtering original light signals so as to filter out light signals outside the predetermined spectrum.

18. The method of claim 16 wherein the static parameters comprise a coordinate of the at least one image object, an area of the at least one image object, an orientation of the at least one image object, colors of the at least one image object, endpoints of the at least one image object, a length to width ratio of the at least one image object, and/or a boundary of the at least one image object.

19. The method of claim 16 wherein determining the static parameters of the at least one image object according to the pixel signals comprises determining a center of gravity of the at least one image object according to a following equation:

$$(G_x, G_y) = \left( \frac{\sum_{(x,y) \in R} L(x,y) \times x}{\sum_{(x,y) \in R} L(x,y)}, \frac{\sum_{(x,y) \in R} L(x,y) \times y}{\sum_{(x,y) \in R} L(x,y)} \right);$$

$$R = \{(x,y) : L(x,y) > TH\};$$

wherein:
L(x, y) is intensity of one of the pixel signals; and
TH is a predetermined threshold.

* * * * *